US005361088A

United States Patent [19]

Ito et al.

[11] Patent Number: 5,361,088

[45] Date of Patent: Nov. 1, 1994

[54] ELECTROPHOTOGRAPHIC PRINTER AND METHOD FOR CONTROLLING THE SAME

[75] Inventors: Katsuyuki Ito; Shinichi Katakura; Takehiko Okubo, all of Tokyo, Japan

[73] Assignee: Oki Electric Industry Co., Ltd., Tokyo, Japan

[21] Appl. No.: 28,747

[22] Filed: Mar. 9, 1993

[30] Foreign Application Priority Data

Mar. 11, 1992 [JP] Japan .................................. 4-052194

[51] Int. Cl.5 ........................ G01D 15/06; G01D 15/14

[52] U.S. Cl. .................................. 346/153.1; 346/160

[58] Field of Search .............................. 346/153.1, 160

[56] References Cited

U.S. PATENT DOCUMENTS 5,043,749 8/1991 Punater et al. .................... 346/153.1

*Primary Examiner*—George H. Miller, Jr.

*Attorney, Agent, or Firm*—Panitch Schwarze Jacobs & Nadel

[57] ABSTRACT

An electrophotographic printer capable of changing its printing speed includes a change signal generating circuit for generating a speed change signal, a head scan cycle setting circuit for setting a cycle time of a scan line of an LED array head, and a motor speed setting circuit for setting a rotation speed of a photosensitive drum. Since the head scan cycle setting circuit and the motor speed setting circuit are activated in response to the speed change signal outputted from the change signal generating circuit, the operations of the photosensitive drum and the LED array head are synchronized with each other, so that the printer can print a fine image on a recording medium. The printer control unit including those circuits also includes control circuits for controlling a constant current supplied to a transfer roller, and for controlling a temperature of fixing rollers, to avoid unevenness of printing.

15 Claims, 6 Drawing Sheets

ELECTROPHOTOGRAPHIC PRINTER AND METHOD FOR CONTROLLING THE SAME

BACKGROUND OF THE INVENTION

1. Field of the Invention

This invention relates to an electrophotographic printer for printing an image on a recording medium through an electrophotographic process and, more particularly, to an electrophotographic printer capable of changing printing speed thereof.

2. Description of Related Art

A electrophotographic printer generally forms an electrostatic latent image on a surface of an electrically charged photosensitive drum by light beam from an emitting source, develops the image by using toner clinging to the electrostatic latent image, and transfers the image by the toner onto a recording medium, such as a paper.

Referring to FIG. 1, such a conventional electrophotographic printer is shown. In this printer, a photosensitive drum 11 rotates in an arrow direction by a drive motor not shown, and keeps its rotation in a constant speed. Using a constant voltage, a charging roller 12 charges the surface of the photosensitive drum 11 uniformly. A laser scanner 13 has its scanning period corresponding to the rotation speed of the photosensitive drum 11, and exposes the surface of the drum 11, sequentially, by scanning motion thereof. By this exposing process, an image, or data to be printed, is formed as an electrostatic latent image on the drum 11. A developer 14 makes toner selectively adhere to the electrostatic latent image on the drum 11 to form an image by the toner. A transfer roller 15 is connected to a constant current source so that a high voltage from the constant current source is supplied to the surface of the roller 15. The transfer roller 15 attracts the developed image onto a recording medium, such as a paper 16, by electrostatic force, and then, transfers the image to the paper 16. A cleaning apparatus 17 eliminates toner remaining on the drum 11 after the image is transferred, and collects the remaining toner. Fixing rollers 18 fuse the toner by heat on the passing paper 16 to fix the toner thereon. The temperature of the fixing rollers 18 is monitored by a thermistor to keep it. The feeding speed of the paper 16 is identified with the speed of the surface of the photosensitive drum 11 and with the speed of the surface of the fixing rollers 18.

In such a conventional electrophotographic printer, it is difficult to change the speed of printing since the rotation speed of the photosensitive drum 11 is set to a certain constant speed. That is, the laser scanner 13 uses a polygon mirror by which the laser beam is deflected to form an electrostatic latent image. To change the speed of a motor for rotating the polygon mirror, the drive mechanism of the polygon mirror requires a response time of several seconds or above. Such an electrophotographic printer, therefore, needs a time for inhibiting printing for several seconds or above, in the case when the photosensitive drum 11 changes its rotation speed without changing its resolution, or its scanning density. In addition, it is difficult in such an electrophotographic printer to comply with operations of respective processes, such as transferring, fixing and the like, with operation of the photosensitive drum 11 when the photosensitive drum 11 changes its rotation speed, and printing thereby tends to be degraded.

SUMMARY OF THE INVENTION

It is an object of the invention to provide an electrophotographic printer capable of changing printing speed thereof without degrading quality of printing.

It is another object of the invention to provide a method for controlling this electrophotographic printer effectively.

The foregoing object is accomplished with an electrophotographic printer including a printer control unit, which synchronously controls at least a rotation speed of a photosensitive drum and scanning operation of an LED (Light Emitting Diode) array head for forming an electrostatic latent image on the photosensitive drum. The printer control unit includes a change signal generating circuit for generating a speed change signal, which is sent to a head scan setting circuit and a motor speed setting circuit. The head scan cycle setting circuit supplies signals for controlling the LED array head in response to the speed change signal, and the motor speed setting circuit supplies signals for controlling the photosensitive drum in response to the same. These signals for controlling respective of the head and the drum are synchronized with each other so as to make the head and the drum operate synchronously. Since the LED array head and the photosensitive dram operate synchronously by the printer control unit, the electrophotographic printer produces fine printing materials, even if printing speed thereof is controlled to change.

In another aspect of the invention, the electrophotographic printer thus constructed further includes a transfer roller for transferring the image onto a recording medium, such as a paper, and fixing rollers for fixing the transferred image, which are controlled by the printer control unit when printing speed of the printer is controlled to change. The transfer roller is controlled by a constant current source for supplying a constant current to the transfer roller, thereby applying charges onto the back of the paper to attract the electrostatic latent image to the paper. When the printing speed is controlled to change, the printer control unit generates the speed change signal to a transfer roller control circuit for changing the current supplied from the constant current source to the transfer roller. By this current control, the transfer roller keeps its providing charges on the back of the paper in a constant density to avoid unevenness of printing. Temperature of the fixing rollers, which rotates corresponding to the photosensitive drum, is controlled by a fixing roller control circuit. The fixing roller control circuit sets another temperature of the fixing rollers when the printing speed is controlled to change so as to avoid unevenness of printing.

In accordance with a preferred embodiment of the invention, the transfer roller control circuit controls, either a ratio of time in which the constant current is applied to the transfer roller or a magnitude of the constant current, in association with the rotation speed of the photosensitive drum, in response to the speed change signal. The ratio of time and the magnitude of the current can be in proportion to the rotation speed of the photosensitive drum. Moreover, the fixing roller control circuit controls the temperature of the fixing rollers, in association with the rotation speed of the photosensitive drum. The temperature can be in proportion to the rotation speed of the photosensitive drum.

The electrophotographic printer thus constructed is controlled by a method including the steps of generating a speed change signal for indicating a change of a printing speed of the electrophotographic printer, changing a rotation speed of the photosensitive drum in response to the speed change signal, changing scanning operation of the LED array head in response to the speed change signal. In this method, the rotation speed and scanning operation are synchronized with each other. According to the preferred embodiment of the invention, the method further includes the steps of changing a ratio of time in which a constant current is applied to the transfer roller in association with the rotation speed of the photosensitive dram, changing a temperature of the fixing rollers in association with the same rotation speed, and changing a rotation speed of the register roller. The steps for the transfer roller and the register roller are performed in response to the speed change signal.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Figure 1:
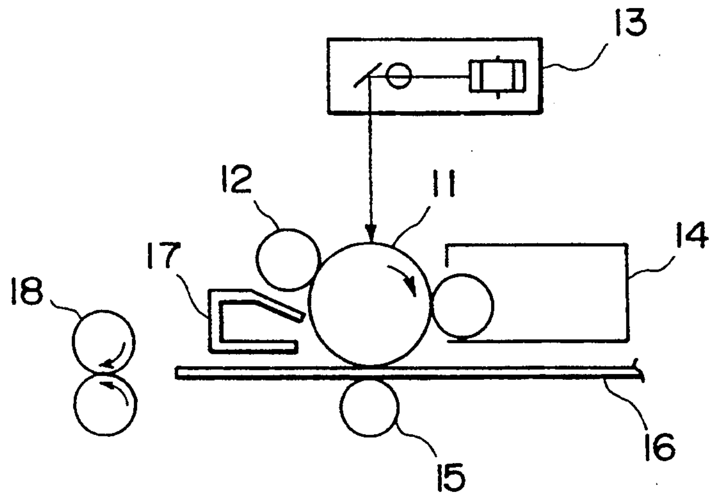
FIG. 1 PRIOR ART
FIG. 1 is a schematic illustration showing an electrophotographic printer of prior art.
Figure 2:
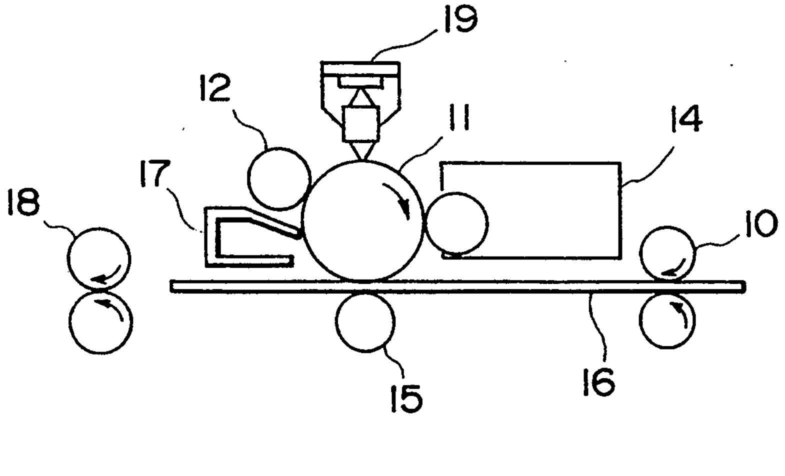
FIG. 2 is a schematic illustration showing an electrophotographic printer according to the invention.

Referring to the drawings in detail, in particular, to FIG. 2, an electrophotographic printer according to a preferred embodiment of the invention is shown.

The electrophotographic printer includes a photosensitive drum 11 formed in a cylindrical shape whose circumferential surface is made of a known photosensitive material to those skilled in the art. The photosensitive drum 11 is capable of rotating around the center thereof by drive power of a drum motor not shown in FIG. 2. A charging roller 12, an LED array head 19, a developer 14, a transfer roller 15 and a cleaning apparatus 17 are arranged around the photosensitive drum 11. The charging roller 12 is constructed in a known fashion, and applied with a constant voltage, and charges the surface of the photosensitive drum 11 uniformly. The LED array head 19 constructed as described below, forms an electrostatic latent image on the circumferential surface of the photosensitive drum 11 by exposing the surface according to video signals supplied from a controller described below. The developer 14 provides toner on the surface of the photosensitive drum 11 at which the latent image is formed, and makes toner selectively adhere to the latent image on the photosensitive drum 11 to develop an image by the toner. The transfer roller 15 is connected to a constant current source not shown. The constant current source supplies a high voltage so as to let the surface of the transfer roller 15 be charged with electric charges, whose polarity is opposite to one of the charging roller 12. A recording medium, such as a paper 16, is fed by register rollers 10, which convey the paper 16 by their rotary motion toward the contact between the photosensitive drum 11 and the transfer roller 15. The electronic charges, applied from the transfer roller 15 to the back of the paper 16, attract the image by the toner toward the paper, thereby transferring the image onto the front of the paper 16. The transferred image on the paper 16 is fused by the fixing rollers 18 and then fixed on the paper 16. The temperature of the fixing rollers 18 is monitored with a thermistor, and is controlled so as to keep in a constant temperature when the printing speed of the electrophotographic printer does not change. The cleaning apparatus 17 eliminates toner remaining on the photosensitive drum 11 after the image is transferred, and collects the remaining toner.

Figure 3:
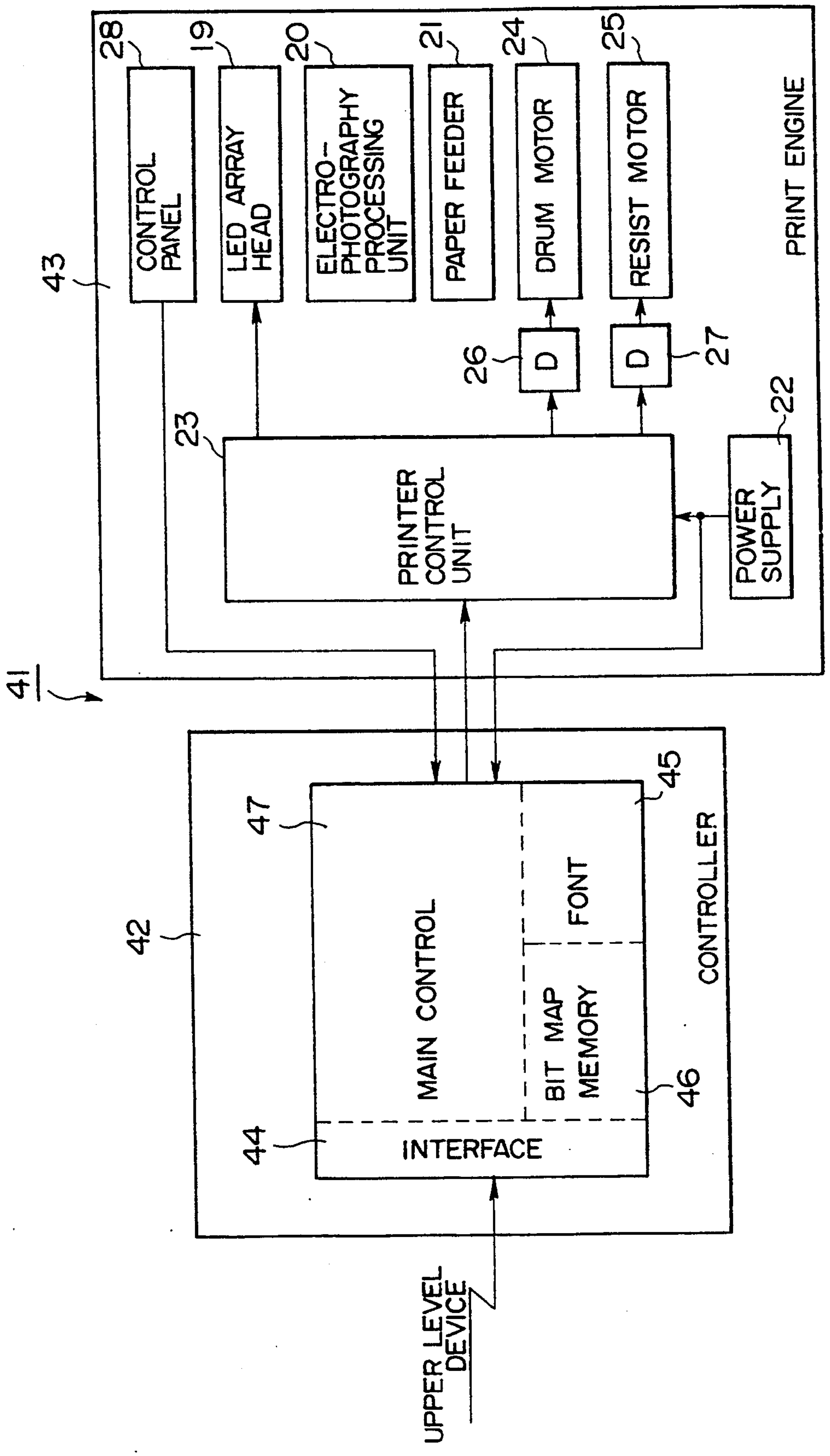
FIG. 3 is a block diagram illustrating a circuitry of the electrophotographic printer of FIG. 2.

Referring to FIG. 3, the circuitry of the electrophotographic printer, generally designated by number 41, according to the invention is shown. The electrophotographic printer 41 is divided into a controller 42 and a print engine 43 by respective functions.

The controller 42, or a microprocessor, constitutes an interface portion 44 for receiving data of printing from an upper level device, for instance, such as a personal computer, a font portion 45 for storing font patterns, a bit map memory portion 46 for storing printing patterns assigned in dot information, and a main control portion 47. The main control portion 47 controls the interface portion 44, the font portion 45, and the bit map memory portion 46. The controller 42 receives control signals from a control panel 28 in the print engine 43. The controller 42 or a printer control unit 23 in the print engine 43 makes a judgment as to whether the printer 41 should change the printing speed or not based on the control signals from the control panel 28, or other information, such as detected data, computed data, or the like.

The print engine 43 includes the LED array head 19 for emitting light beam in accordance with a printing pattern of each line based on the data of printing, an electrophotographic processing unit 20 for charging, developing, transferring, fixing and cleaning, a paper feeder 21 for conveying the paper 16, a power supply 22 for supplying a voltage enough to activate the controller 42 and the printer control unit 23, the control panel 28 handled by an operator of this printer. The print engine 43 further includes the printer control unit 23 for controlling the LED array head 19, the electrophotographic processing unit 20, the paper feeder 21, and the power supply 22. The printer control unit 23 further controls a drum motor driver 26 for driving a drum motor 24 and a resist motor driver 27 for driving a resist motor 25. The drum motor 24 rotates the photosensitive drum 11, and the resist motor 25 rotates the resist rollers 10.

Figure 4:
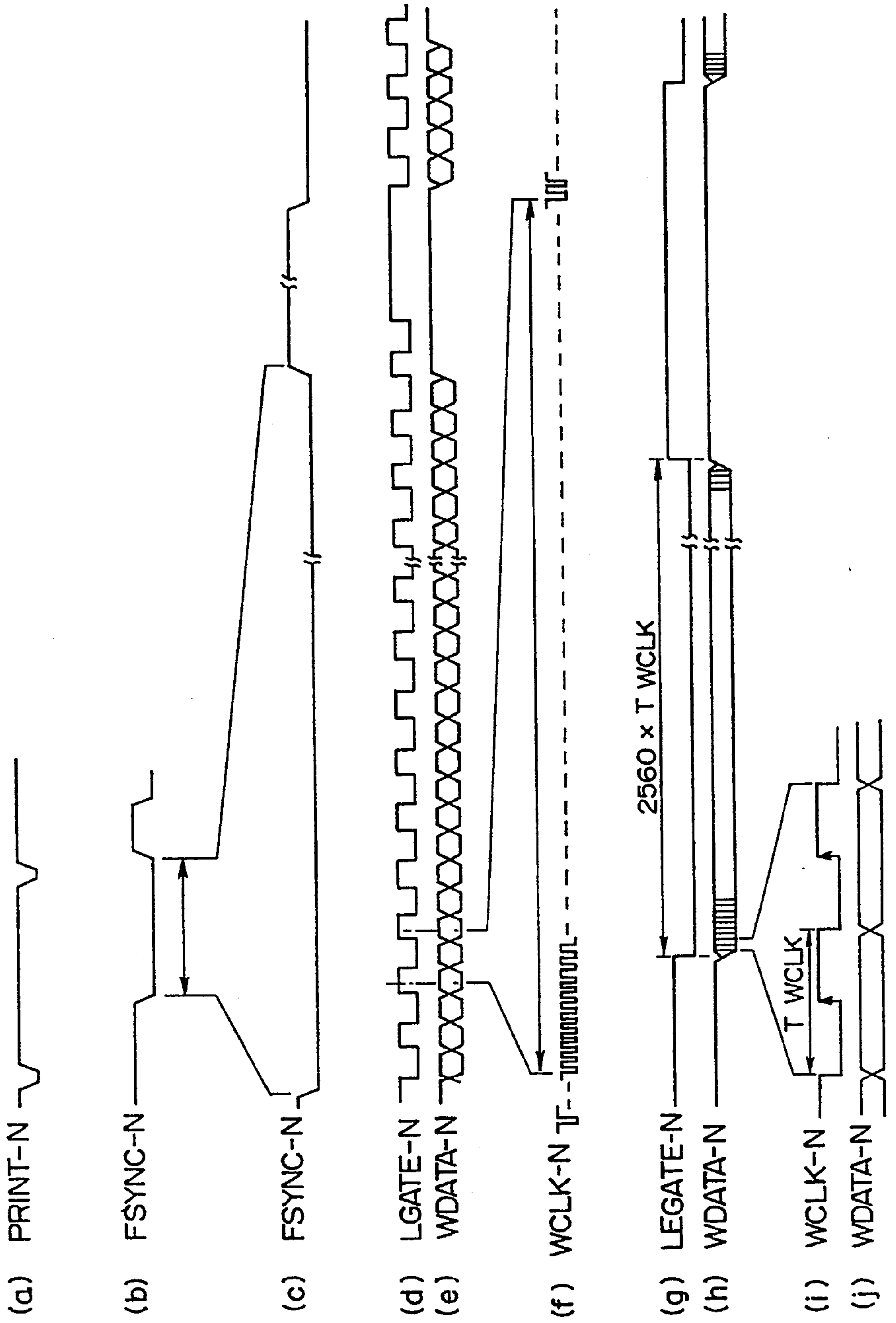
FIG. 4 is a time chart showing signals communicating between a controller a print engine of FIG. 3.

Referring to FIG. 4, signals communicated between the controller 42 and the print engine 43 are shown. In FIG. 4, a signal PRINT-N is a signal indicating a command of a start of printing for the print engine 43. A signal FSYNC-N is a sub scan signal of a video signal, and indicates positions of the beginning and the end of the paper 16. This signal FSYNC-N is outputted from the print engine 43 to the controller 42. A signal LGATE-N is a main scan signal of the video signal, and indicates effectiveness of printing data in each line. This signal LGATE-N is outputted from the print engine 43 to the controller 42. A signal WDATA-N indicates existence of dot or no clot of printing by its level, and synchronizes with a downward edge of a signal WCLK-N, a clock signal. The signal WCLK-N is outputted from the print engine 43 to the controller 42 to transmit the signal WDATA-N. The signal WCLK-N has a cycle time $T_{wclk}$, and the LED array head 19 has 2,560 dots. Therefore, one cycle time of the signal LGATE-N is equal to 2,560 multiplied by $T_{wclk}$, which is the minimum time necessary to print one line.

Figure 5:
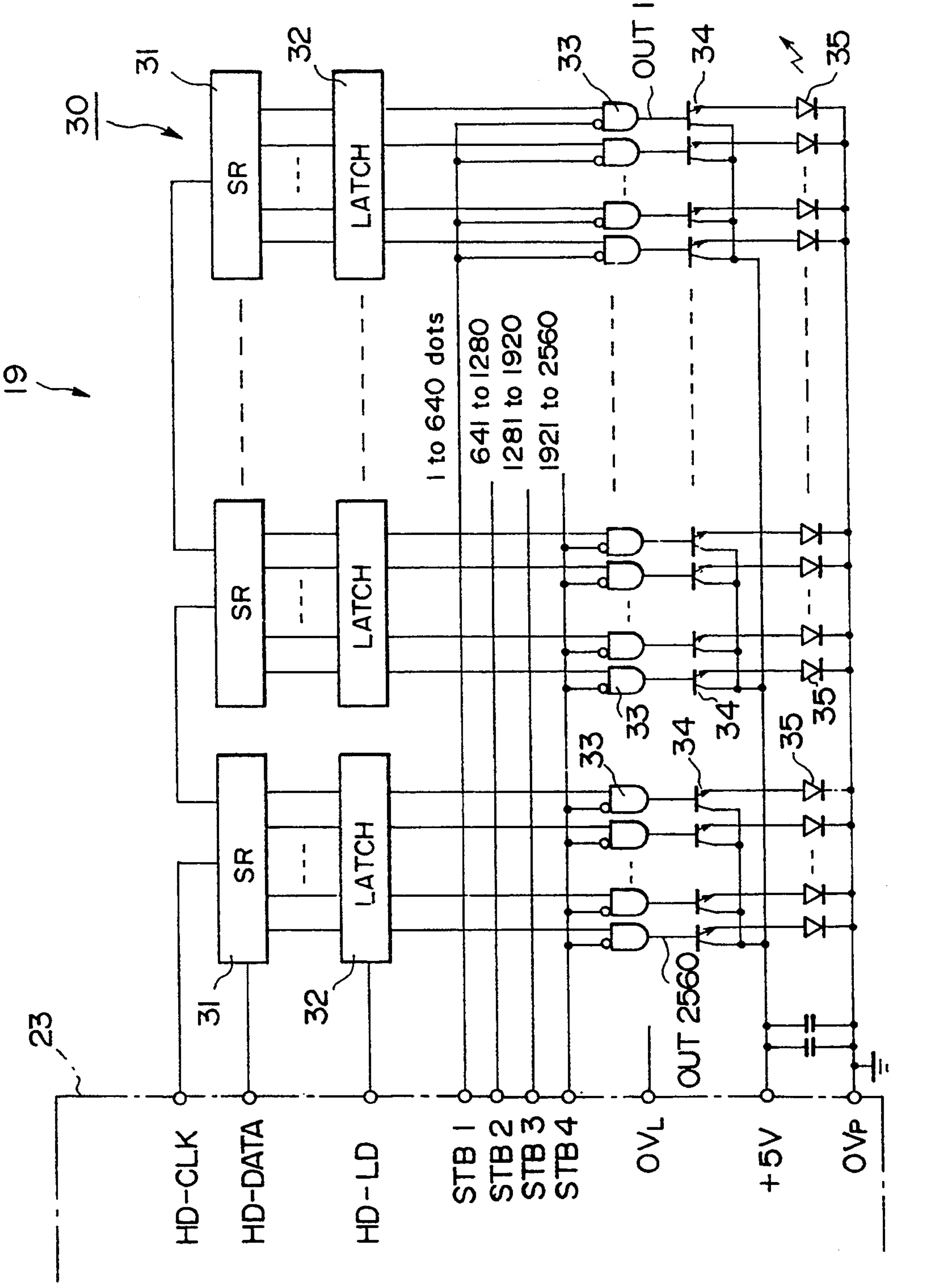
FIG. 5 is a block diagram showing a circuitry of an LED array head of FIG. 3.

FIG. 5 shows a circuitry of the LED array head 19. The LED array head 19 includes forty driver IC sets 30 arranged in one line. Each driver IC set 30 includes a 64 bits shift register 31 and a latch circuit 32. The shift registers 31 arc connected serially with each other so as to hold a signal HD-DATA of 2,560 bits one line data at one time. Each latch circuit 32 is capable of storing 64 bits data, at a time, outputted in parallel from the corresponding shift register 31. The LED array head 19 further includes a plurality, or 2,560 piece, of gate circuits 33, drive transistors 34, and LED devices 35. Each gate circuit 33 activates when receiving an output signal from the latch circuit 32 and one of strobe signals STB1 to STB4. Each drive transistor 34 turns on and off in accordance with an output signal from the corresponding gate circuit 33. The LED devices 35, composed by 2,560 devices as described above, emit in response to drive currents supplied from the drive transistors 34, respectively. The LED devices 35 are arranged in one line along to the scan line direction. The LED devices 35 are divided into 4 blocks so as to be selected individually by the respective signals STB1 to STB4. The signal STB1 is outputted to the 1st to 640th LED devices 35. The signal STB2 is outputted to the 641st to 1280th LED devices 35. The signal STB3 is outputted to the 1281st to 1920th LED devices 35. The signal STB4 is outputted to the 1921st to 2560th LED devices 35. Each drive IC set 30 is composed by a monolithic semiconductor chip with sixty-four of the LED devices, which is fabricated on the chip. Since the drive transistor 34 turns on at a time that the corresponding bit of the signal HD-DATA indicates turning-on of light beam and the corresponding strobe signal is a low level, the LED devices 35 selectively emit light beam toward the surface of the photosensitive drum 11 to expose it at a time that the drive transistor 34 turns on.

Figure 6:
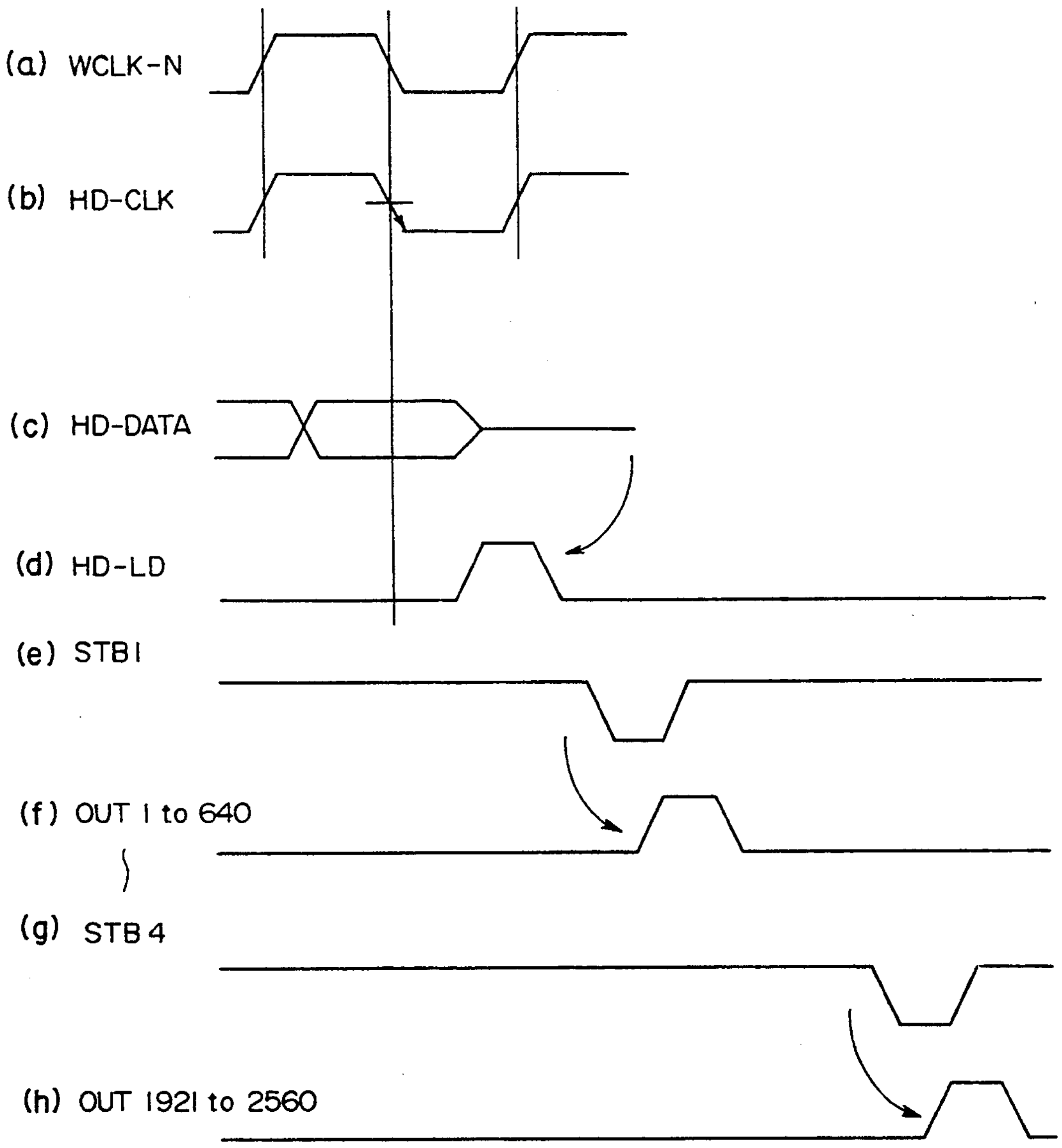
FIG. 6 is a time chart showing signals for the LED array head.

In operation of the LED array head 19, each bit data of the signal HD-DATA outputted from printer control unit 23 is shifted among the shift registers 31 in synchrony with a signal HD-CLK as a transfer clock. As shown in FIG. 6, the signal HD-CLK ordinarily has the same cycle time and phase as the signal HD-DATA. The signal HD-DATA is sampled at a time that a downward edge of the signal HD-CLK. The sampled signal HD-DATA is sequentially transferred to the shift registers 31. When a bit in the sampled signal HD-DATA is shifted by 64 bits, the bit is outputted to the next shift register 31. Pulses of 2,560 in the signal HD-CLK make data shift operation of the signal HD-DATA in all shift registers 31 complete. The data of the signal HD-DATA are sent in parallel to the latch circuits 32 in response to the signal HD-LD, which is generated when the data shift operation is completed and serves as a signal for latching. The data of the signal HD-DATA are stored at the latch circuits 32. The signals STB 1 to STB 4 are sequentially outputted from the printer control unit 32. The gate circuit 33 operates with one of the signals STB 1 to STB 4 and one bit data of the stored signal HD-DATA. When the signals STB 1 to STB 4 are at a low level, signals OUT 1 to OUT 2560 become high to turn on the drive transistor 34, if the corresponding, stored data indicates turning-on of light beam. The drive transistor 34, when turned on, flows a drive current through the corresponding LED device 35 to emit it. Time in which the LED device 35 is turned on is determined by a time in which the signals STB 1 to STB 4 are remained at the low level.

When the printing speed is changed, the operation of LED array head 19 must be synchronized or cooperated with the operations of other members, such as the photosensitive drum 11, the resist rollers 10, the transfer roller 15, and the fixing rollers 18. The LED array head 19 has a structure for scanning by means of an electronic circuitry. The LED array head 19 has a plurality of the LED devices 35 arrayed in one line along the scan line. The LED devices 35 emit selectively in response to the signal HD-DATA outputted from the printer control unit 23 and to signals STB1 to STB4. Recording density in a scan line direction is determined by the pitch of the LED devices 35, and recording density in a direction in which the paper is conveyed is determined by a ratio between the rotation speed of the photosensitive drum and the cycle of emission of the LED devices 35, in other words, the cycle of the scan line. Therefore, it is necessary to synchronize the cycle of the scan line of the LED array head 19 and the rotation speed of the photosensitive drum 11 with each other in order to change the printing speed without a change of the recording density. Since the drum motor driver 26 for driving the drum motor 24 and the LED array head 19 are controlled by the printer control unit 23, the cycle of the scan line and the rotation speed of the photosensitive drum 11 are synchronized with each other to change the printing speed by changing the set value of the timer in the printer control unit 23 or by changing the set value in the software in the printer control unit 23. Although the rotation speed of the photosensitive drum 11 is changed by a motor drive control signal S2 for the drum motor 24 as described below, it is preferred for the photosensitive drum 11 to change the rotation speed gradually since there is a time lag between motions of the drum 11 and its drive power transmitting mechanism. Moreover, in this printer, although the paper 16 is conveyed by rotation of the resist rollers 10, the resist motor 25 has a drive system separated from one of the drum motor 24 to drive independently. Therefore, it is necessary to change the rotation speed of the resist rollers 10 by controlling the resist motor 25 in accordance with a change of the rotation speed of the photosensitive drum 11. In the case of the resist rollers 10, as well as the case of the photosensitive drum 11, the printing speed can be changed by changing the set value of the timer in the printer control unit 23 or by changing the set value in the software in the printer control unit 23.

Figure 7:
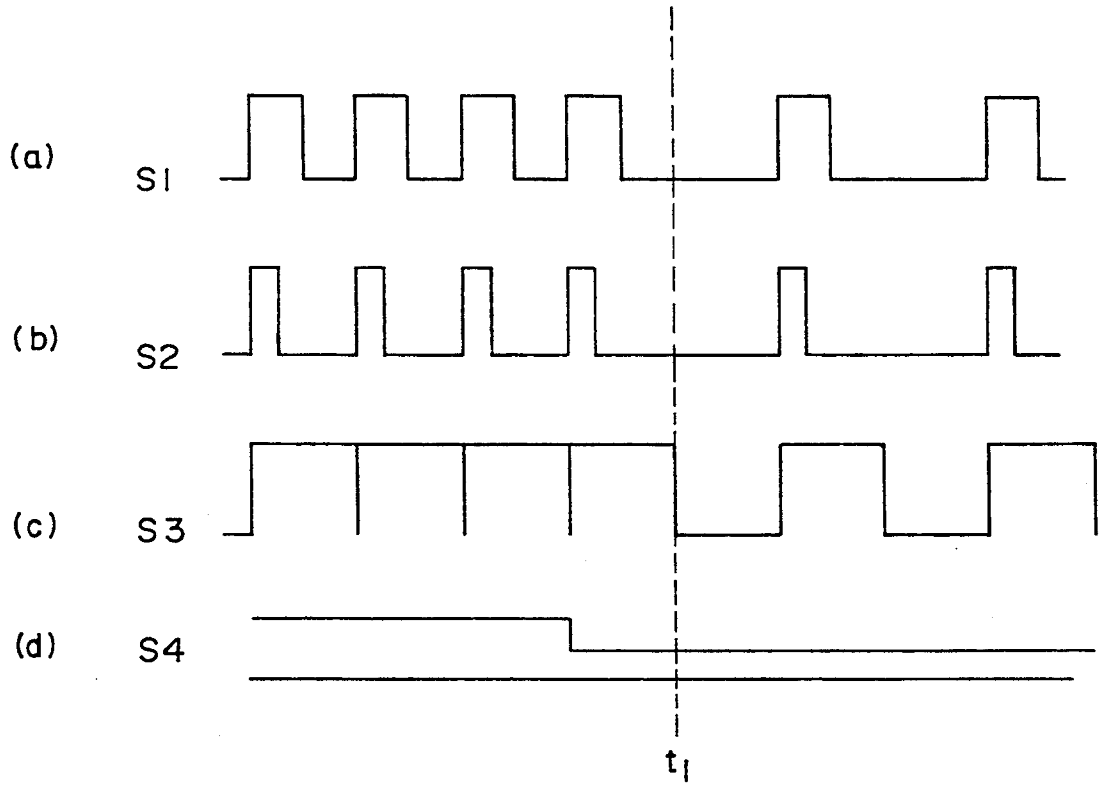
FIG. 7 is a time chart showing signals for the printer control unit of FIG. 3.

Referring to FIG. 7, a time chart of which the printing speed changes, the operation of the electrophotographic printer at a time of which the printing speed is changed is shown. In FIG. 7, time t1 represents a time at which the scan line cycle becomes twice. The printer control unit 23, as shown in FIG. 3, outputs the signals STB1 to STB4 for the LED array head 19, sequentially, to print each line, based on the speed change signal S1. The printer control unit 23 also outputs the signal HD-LD giving a timing for storing at the latch circuits 32 in the LED array head 19 in response to the signal S1. The printer control unit 23 outputs the motor drive control signal S2 for controlling the drum motor driver 26 and the resist motor driver 27 in response to and in synchrony with the signal S1. The motor drive control signal S2 provides a timing for supply of phase signals to the motors 24, 25. In such an electrophotographic printing process, since the charging roller 12 is driven by the photosensitive drum 11 and is applied with a high constant voltage at any time, it is not necessary for the charging roller 12 to change operation for charging when the printing speed is changed. In the developer 14, since the drum motor 24 drives the developer roller, the rotation speed of the developer roller changes corresponding to the rotation speed of the photosensitive drum 11 without any particular control.

The transfer roller 15 rotates in accordance with the rotation of the photosensitive drum 11. A high voltage constant current source not shown is connected to the transfer roller 15 to apply electric charges uniformly to the back of the paper so as to prevent its transfer efficiency of the toner from lowering due to the thickness of the paper 16 or electrical resistance. In the case when the printing speed is controlled to change, if the transfer roller 15 applies the same electric charges as applied before the change of the printing speed even while the rotation speed of the photosensitive drum became half at the change, amount of electrical charges applied to the paper 16 per unit area becomes twice, thereby producing unevenness of printing. To prevent such unevenness of printing, the printer control unit 23 controls to maintain the amount of electrical charges per unit area in response to the speed change signal S1 by extending the cycle time for supplying the constant current from the constant current source as shown by a signal S3 of FIG. 7.

The fixing rollers 18 are driven by the drum motor 24, so that the rotation speed of the fixing rollers 18 is changed in accordance with the rotation speed of the photosensitive drum 11. If unchanged, the temperature of the fixing rollers 18 may cause less or over fixation since the convey speed of the paper 16 is changed in accordance with the rotation speed of the fixing rollers 18. To prevent such less or over fixation, the printer control 23 controls the temperature of the fixing rollers 18 so as to fuse the toner at a proper temperature. By such temperature control, the electrophotographic printer can print a high-grade image without unevenness of printing.

As described above, the printer control unit 23 controls the LED array head 19 so that the LED devices 35 emit light beam at every scan line cycle. The printer control unit 23 generates the speed change signal S1 and produces the motor drive control signal S2 for setting rotation speeds of the photosensitive drum 11 and the resist motor 25 in response to the speed change signal S1. The printer control 23 also produces the signals STB1 to STB4 and HD-LD for proper scan operation of the LED array head 19. Since the signals STB 1 to STB4 and HD-LD and the motor drive control signal S2 are based on the speed change signal S1, those signals are synchronized with each other, so that the electrophotographic printer exposes its photosensitive drum 11 in accordance with the rotation speed of the photosensitive drum 11.

The transfer roller 15 is connected to the high voltage constant current source, which is able to change the ratio of time for supplying the constant current in accordance with the rotation speed of the photosensitive dram 11. The fixing rollers 18 are controlled by the temperature control signal S4 from the printer control 23 so as to change the temperature of the fixing rollers 18 in accordance with the rotation speed of the photosensitive drum 11. By such current and temperature control, the electrophotographic printer is able to maintain the high quality of printing even if the printing speed is changed. In addition, the electrophotographic printer can reduce capacity of buffer memories and costs of the printer itself.

It is understood that although the present invention has been described in detail with respect to preferred embodiments thereof, various other embodiments and variations are possible to those skilled in the art which fall within the scope and spirit of the invention, and such other embodiments and variations are intended to be covered by the following claims.

What is claimed is:

1. An electrophotographic printer for printing an image on a recording medium, comprising:
- a photosensitive body capable of rotating;
- a drum motor for rotating the photosensitive body at a plurality of rotating speeds;
- charging means for charging a surface of said photosensitive body;
- light emitting means for emitting light for forming an electrostatic latent image on said surface;
- developing means for developing said electrostatic latent image to form a developed image on said surface;
- transfer means for transferring said developed image to said recording medium;
- fixing means for fixing the image transferred by said transfer means on to said recording medium;
- a printer control unit having an output for outputing a speed change signal, the speed change signal being indicative of a printing speed; and
- a drum motor driver having an input for receiving the speed change signal and an output for providing a motor control signal to the drum motor, the motor control signal for controlling the rotating speed of the photosensitive body in response to the speed change signal,
- the light emitting means including an input for receiving the speed change signal and circuitry for setting a cycle time for a scan line of the light emitting means in accordance with the rotating speed of the photosensitive body and in response to the speed change signal.

2. An electrophotographic printer as set forth in claim 1, and further comprising a constant current source for supplying a constant current in order to control electric charges on said transfer means, wherein said printer control means further comprises transfer control means for controlling a ratio of time of which said constant current is supplied to said transfer means in response to said speed change signal.

3. An electrophotographic printer as set forth in claim 2, wherein said ratio is changed so as to be in proportion to said rotation speed of said photosensitive body.

4. An electrophotographic printer as set forth in claim 1, and further comprising a constant current source for supplying a constant current in order to control electric charges on said transfer means, wherein said printer control means further comprises transfer control means for controlling a magnitude of said constant current in accordance with said rotation speed of said photosensitive body in response to said speed change signal.

5. An electrophotographic printer as set forth in claim 4, wherein said magnitude is changed so as to be in proportion to said rotation speed of said photosensitive body.

6. An electrophotographic printer as set forth in claim 1, wherein said printer control means further comprises fixing control means for controlling a temperature of said fixing means in accordance with said rotation speed of said photosensitive body when said printing speed is changed.

7. An electrophotographic printer as set forth in claim 6, wherein said temperature is changed so as to be in proportion to said rotation speed of said photosensitive body.

8. An electrophotographic printer as set forth in claim 1, and further comprising a conveying roller for conveying said recording medium, whose rotation speed is controlled by said motor control signal.

9. An electrophotographic printer for printing an image on a recording medium, comprising:

a photosensitive body capable of rotating;

a drum motor for rotating the photosensitive body at a plurality of rotating speeds;

charging means for charging a surface of said photosensitive body;

light emitting means for emitting light for forming an electrostatic latent image on said surface;

developing means for developing said electrostatic latent image to form a developed image on said surface;

transfer means for transferring said developed image to said recording medium;

a constant current source for supplying a constant current to said transfer means in order to control electric charges on said transfer means;

fixing means for fixing the transferred image on to said recording medium;

conveying means for conveying said recording medium;

a printer control unit having an output for outputing a speed change signal, the speed change signal being indicative of a printing speed; and a drum motor driver having an input for receiving the speed change signal and an output for providing a motor control signal to the drum motor, the motor control signal for controlling the rotating speed of the photosensitive body in response to the speed change signal, the light emitting means including an input for receiving the speed change signal and circuitry for setting a cycle time for a scan line of the light emitting means in accordance with the rotating speed of the photosensitive body and in response to the speed change signal, the constant current source having an input for receiving the speed change signal, the constant current supplied to the transfer means being set in accordance with the rotating speed of the photosensitive body and in response to the speed change signal, the fixing means having a temperature and an input for receiving the speed change signal, the temperature being set in accordance with the rotating speed of the photosensitive body and in response to the speed change signal.

10. A method for controlling an electrophotographic printer for printing an image on a recording medium, comprising the following steps of:

(a) forming an electrostatic latent image on a rotating photosensitive body by light beam of light emitting means;

(b) developing said electrostatic latent image on the photosensitive body to form a developed image;

(c) transferring said developed image on said recording medium;

(d) fixing the image transferred on said recording medium;

(e) commanding a change of a printing speed of said electrophotographic printer to generate a speed change signal;

(f) changing a rotation speed of said photosensitive body in response to said speed change signal;

(g) changing a cycle time of a scan line of said light beam in response to said speed change signal.

11. A method as set forth in claim 10, and further comprising the step of changing a ratio of time in which a constant current is supplied for controlling electric charges on transfer means for transferring said developed image, in response to said speed change signal.

12. A method as set forth in claim 10, and further comprising the step of changing a magnitude of a constant current for controlling electric charges on transfer means for transferring said developed image, in response to said speed change signal.

13. A method as set forth in claim 10, and further comprising the step of changing a rotation speed of conveying means for conveying said recording medium in response to said speed change signal.

14. A method for controlling an electrophotographic printer for printing an image on a recording medium, comprising the following steps of:

(a) forming an electrostatic latent image on the rotating photosensitive body by light beam of light emitting means;

(b) developing said electrostatic latent image on the photosensitive body to form a developed image;

(c) transferring said developed image on said recording medium;

(d) fixing the image transferred on said recording medium;

(e) commanding a change of a printing speed of said electrophotographic printer to generate a speed change signal;

(f) changing a rotation speed of said photosensitive body in response to said speed change signal;

(g) changing a cycle time of a scan line of said light beam in response to said speed change signal;

(h) changing a ratio of time in which a constant current is supplied for controlling electric charges on transfer means for transferring said developed image, in response to said speed change signal; and (i) changing a rotation speed of conveying means for conveying said recording medium in response to said speed change signal.

15. A method for controlling an electrophotographic printer for printing an image on a recording medium, comprising the following steps of:

(a) forming an electrostatic latent image on a rotating photosensitive body by light beam of light emitting means;

(b) developing said electrostatic latent image on the photosensitive body to form a developed image;

(c) transferring said developed image on said recording medium;

(d) fixing the image transferred on said recording medium;

(e) commanding a change of a printing speed of said electrophotographic printer to generate a speed change signal;

(f) changing a rotation speed of said photosensitive body in response to said speed change signal;

(g) changing a cycle time of a scan line of said light beam in response to said speed change signal;

(h) changing a magnitude of a constant current which is supplied for controlling electric charges on transfer means for transferring said developed image, in response to said speed change signal; and (i) changing a rotation speed of conveying means for conveying said recording medium in response to said speed change signal.

* * * * *